Feb. 27, 1951 W. H. BROWN 2,543,686
HYDRAULIC MOTOR MECHANISM FOR WINDSHIELD WIPERS
Filed June 29, 1945 3 Sheets-Sheet 1
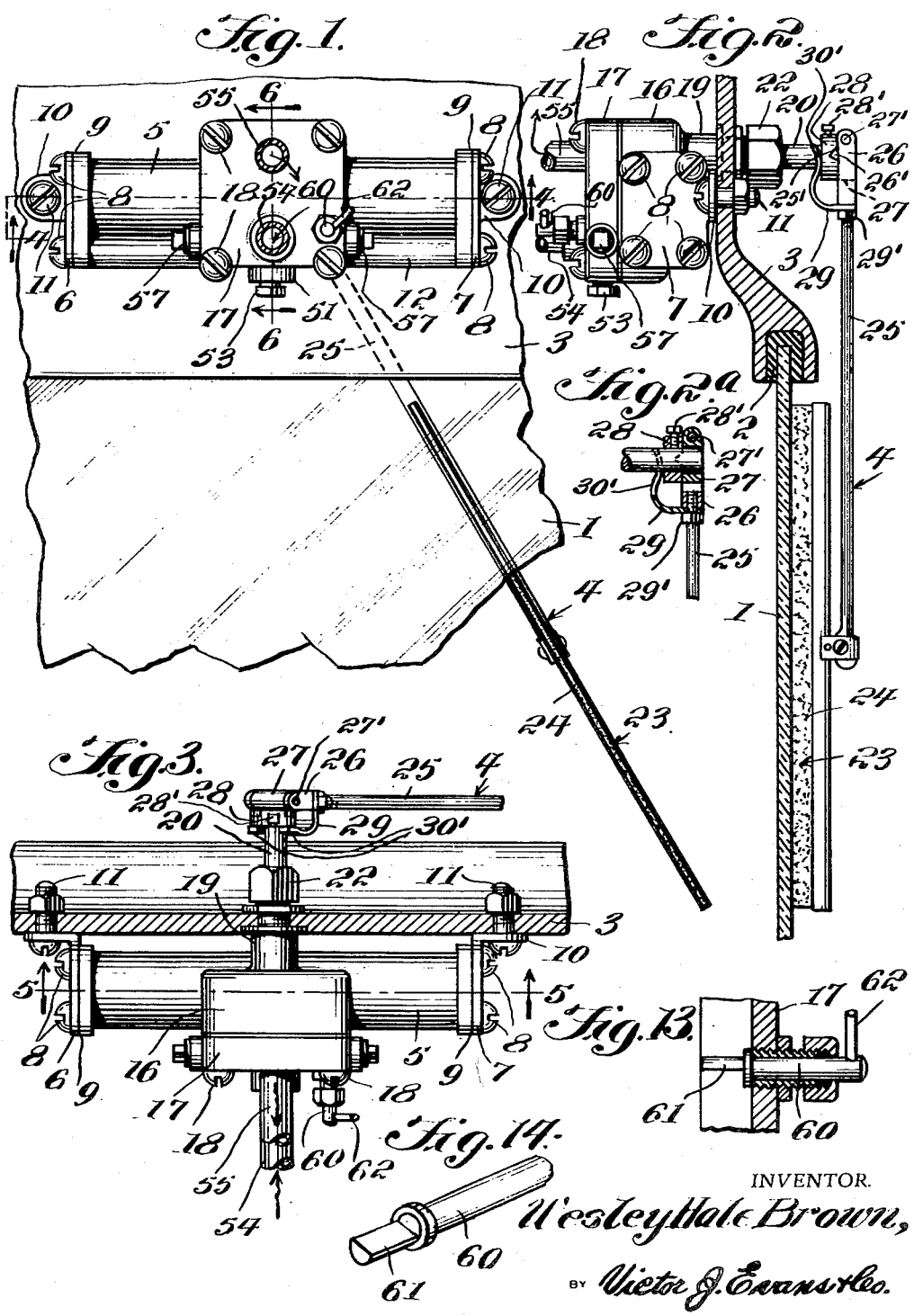
INVENTOR.
Wesley Hale Brown,
BY Victor J. Evans & Co.
ATTORNEYS

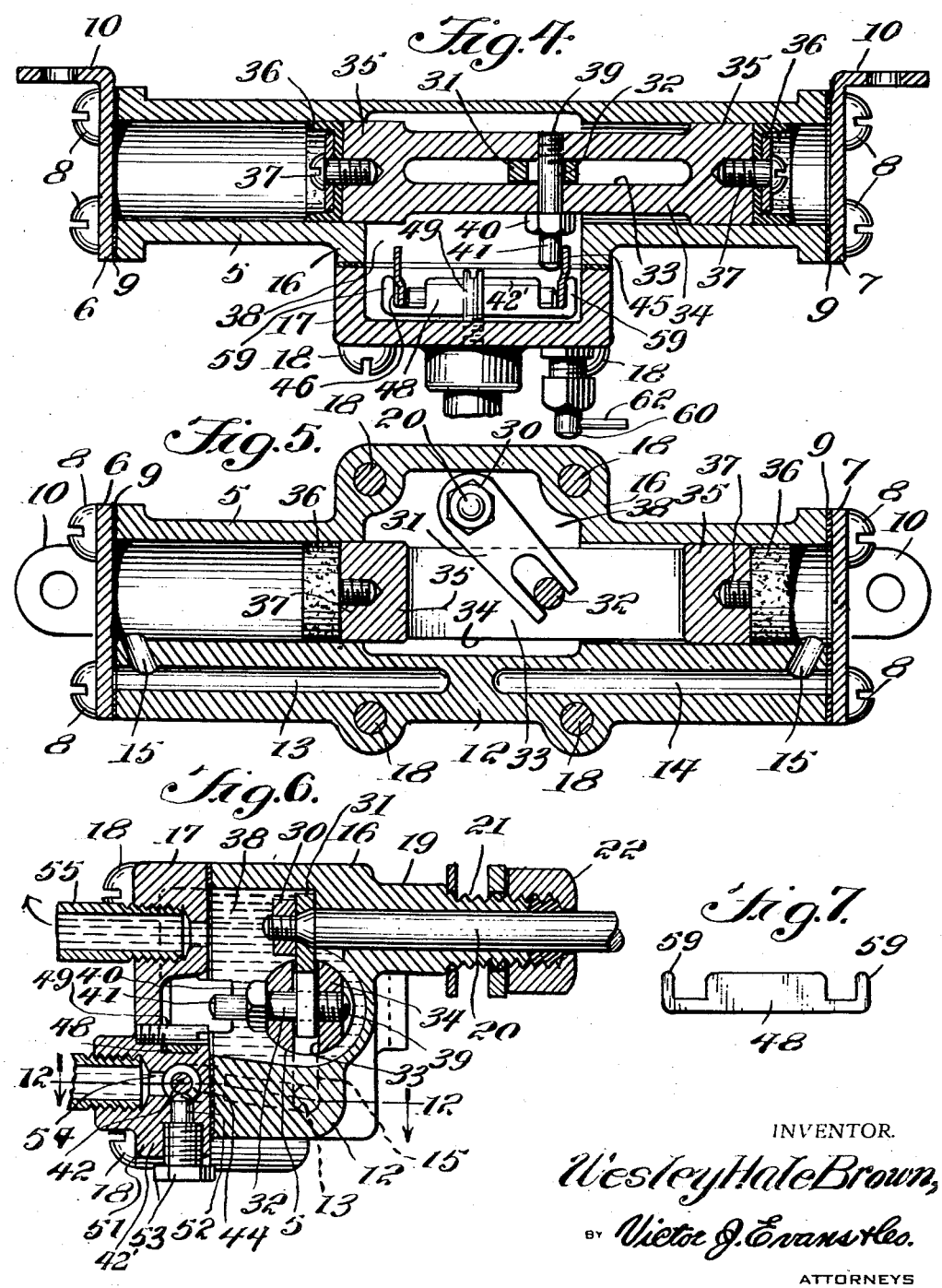

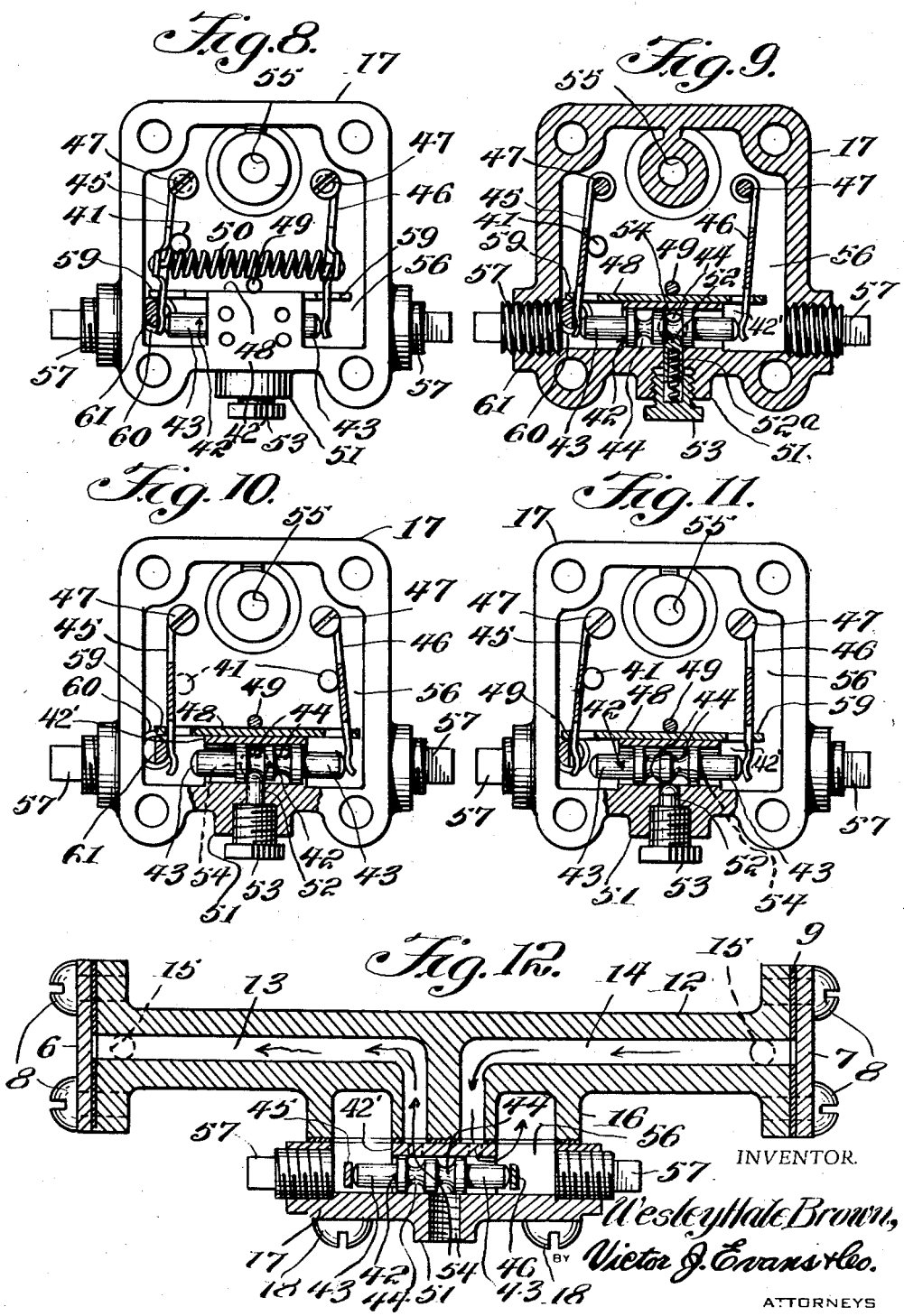

Patented Feb. 27, 1951

2,543,686

UNITED STATES PATENT OFFICE 2,543,686

HYDRAULIC MOTOR MECHANISM FOR WINDSHIELD WIPERS

Wesley Hale Brown, Knoxville, Tenn., assignor of one-half to Wade Hatcher, Knoxville, Tenn.

Application June 29, 1945, Serial No. 602,356

8 Claims. (Cl. 121—164)

My present invention, in its broad aspect, has reference to improvements in wind shield wipers for use with automobiles, trucks and the like, and wherever a source of oil pressure power exists by reason of the vehicle being equipped with a pressure lubricating (or with constant-flow oil pump for the purpose of driving the windshield wiper). It is of particular value on vehicles equipped with Diesel type engines, or with carbureted engines operating largely under open throttle conditions, which types of operation produce insufficient inlet manifold pressure reduction to maintain satisfactory operation of so-called "vacuum" wipers. In carrying into effect the objects and advantages of my invention, I utilize the pressure of oil in the engine lubricating system, and to that end I provide an oil inlet or supply pipe, and an oil return pipe to my windshield wiper, which has operating mechanism including a double-headed piston in a double-headed cylinder with valve means for directing the oil under pressure to the opposite heads of the piston to reciprocate the same. There is provided a swinging windshield wiper with the usual spring clutch and link connections with the piston to be oscillated or swung in respect to the reciprocations of the piston. The valve is non-adjustable, is provided with a novel and improved shifting mechanism, and a stop mechanism and the piston structure is improved, the casing and assembly is improved, and the device is simple, sturdy, efficient and practical for the purposes intended.

Other and equally important objects and advantages of my invention will be apparent from the following description and drawings, but it is pointed out that changes in form, size, shape, materials, and construction and arrangement of parts is permissible and within the purview of my broad inventive concept, and the scope of the appended claims.

In the drawings, wherein I have illustrated a preferred form of my invention:

Figure 1 is an elevation of my invention looking at the back of the casing, and forward through the windshield of a vehicle;

Figure 2 is a side (or end) view;

Figure 2A is a section through the wiper clutch and spring;

Figure 3 is a top plan view;

Figure 4 is a longitudinal section on the line 4—4 of Figure 1;

Figure 5 is a longitudinal section on the line 5—5 of Figure 3;

Figure 6 is a transverse section on the line 6—6 of Figure 1;

Figure 7 is a top view of the valve slide;

Figure 8 is a view of the removed valve cover and valve and the valve at its limit, and the housing with the cover secured and the valve at its limit of movement in one direction with the stop in the "off" position so that the reversing operation will follow;

Figure 9 is a vertical section through the valve and shows the valve body and plunger;

Figure 10 is a view with the valve and casing with the cover removed and partly broken away to shown the stop in the "on" position so that the yoke cannot pull the valve over the plunger;

Figure 11 is a view of the valve and casing with the cover removed and partly broken away to show the stop in "off" position, and the valve pulled over the plunger by the yoke;

Figure 12 is a section through the valve body showing the valves and chamber, and conduits leading into and out of the chamber;

Figure 13 is a detail view of the stop and operating lever, and

Figure 14 is a perspective view of the stop cam.

In the drawings wherein like characters of reference are used to designate like or similar parts throughout the several views:

The windshield of a vehicle is designated by the numeral 1 and has the usual mount 2 and top rail 3 on which my wndshield wiper, generally designated by 4, is mounted.

My windshield wiped is formed with a cylinder 5, having heads 6 and 7 attached by screws 8 and gasketed, as at 9. The heads have bracket extensions 10, by means of which the operating structure and the cylinder is attached to the back of the top rail 3, above the windshield 1, by bolts 11. At the bottom of the cylinder 5 is an enlargement 12, extending from end to end, and formed with opposed oil conduits 13 and 14, each having a duct 15 leading into the cylinder at the heads. The cylinder, midway its ends, and extending from the enlargement 12, and at the back of the cylinder, is formed with a casing formation 16 having a cover 17 attached by screws 18 to the casing. At the front of the casing formation 16 is a boss 19 which is bored to have connection with the interior of the casing, as shown in Figure 6. The windshield wiper operating shaft 20 extends into the casing through the boss. The boss has a reduced threaded extension 21 extending through the top rail 3 to the front of the windshield and held in place by a packing nut 22.

The arm 25 has a yoke 26 which is pivotally mounted on a hanger block 27 by means of a pivot pin 27'. A connection 28 mounted on the shaft 20 and fixed thereto by a set screw 28' oscillates the hanger block 27 by means of a V-shaped notch 25' co-acting with V-shaped extensions 26' formed on the hanger block 27 which is loosely mounted on the shaft 20.

The spring 29 carried by the stem 25 and retained in place by nut 29' has a forked end 30' which is positioned on the shaft 20 adjacent the connection 28 and serves to hold the hanger block 27 against the connection 28. The spring 29 also places tension upon the arm 25 to hold the wiper 23 in close contact with the windshield 1. The arm 25 is removable in order that a new wiper blade may be replaced when necessary.

Fixed by the nut 30 to the opposite end of the shaft 20 is a forked arm 31 which engages a pin 32 across the slot 33 in a double-headed piston 34. The heads 35 of the piston 34 are each provided with cup leather or other suitable packing 36, held in place by screws 37. As shown in Figures 5 and 6, the casing forms a chamber 38 about the medial part of the piston. The pin 32 is threaded as at 39 and has a head 40 and an extended end 41 which operates the valve structure in the manner which will hereinafter be made apparent.

The cover 17 of the casing formation 16 is formed with a valve housing 42' which reciprocally carries the valve body 42 which has opposed reduced ends 43 and double annular grooves 44, and valve operating levers 45 and 46 attached by screws 47 to engage the ends 43 of the valve to shift the same. A trip link 48 is positioned in a groove on the valve housing 42' in reciprocal sliding relation thereto and the trip link 48 extends between the levers 45 and 46 and is held in place on the valve housing 42' by a pin 49.

The trip link 48 is provided with an inwardly directed slot having an open end forming the hooked ends 59. The levers 45 and 46 are positioned within the hooked ends 59 to be operated as later to be described. The valve levers are connected by a spring 50. Mounted in a boss 51 below the valve body 42 is a plunger 52, pressed by a spring 52a, a threaded plug 53 and an inlet and outlet 54 and 55, respectively. The valve chamber 56 is closed by threaded plugs 57—see Figure 12. In operation, the shut off valve (not shown) in the pressure line from the oil pump on the engine (not shown) is opened. Oil flows into valve chamber 56 through inlet 54—see Figure 10—and through conduit 14 and duct 15 to the right hand end of the cylinder, forcing the piston to the left. Oil in the left cylinder is discharged through conduit 13 and duct 15 and back to the engine through outlet 55, the valve ports in the valve body 42, and a return tube (not shown). When the piston approaches its extreme left hand position, the end 41 of pin 32 contacts the lever 45 to cause movement thereof in the same direction as the movement of the piston 35. Spring 50 connecting levers 45 and 46 will then cause lever 46 to move to apply pressure on the opposite end 43 of valve body 42. Further movement of the piston and end 41 of pin 32 causes the lever 45 to contact the hooked end 59 of trip link 48 through which it extends causing the link 48 to slide in the same direction and cause the opposite hooked end thereof to engage the lever 46. Further movement of the link 48 will apply sufficient pressure upon the end 43 of the valve body 42 to overcome the tension of plunger spring 52a causing the plunger 52 to be disengaged from its position in one of the grooves 44. Whereupon the spring 50 snaps the valve to the right hand position and oil inlet is placed into communication with the right hand cylinder, and the left hand cylinder is in communication with the outlet 55 and a return tube (not shown) to the engine and the movement of the piston is reversed and transferred through the forked arm and operating shaft to the windshield wiper. The cycle of operation is continued as long as oil is supplied under pressure.

In order to stop my device, I provide a pin 60 having a cam end 61, and an operating handle 62. With the pin 60 and cam 61 turned to the position shown in Figure 10, the valve cannot be pulled over the plunger, since the movement of the lever is stopped before the tension of the plunger spring 52a is overcome. The wiper blade is, therefore, held near the end of its stroke, until the pin 60 and cam 61 are turned to the "on" or open position of Figures 8 and 9.

From the foregoing, it is believed that the operation and advantages of my invention will be apparent, but it is again emphasized that interpretation of the scope of my invention should only be conclusive when made in the light of the subjoined claims.

I claim:

1. A windshield wiper mechanism for use with vehicles equipped with oil pressure systems, comprising a double headed cylinder, a double headed reciprocating piston in the cylinder, a windshield wiper operating shaft, a forked arm on one end of the shaft, a pin carried by the piston and engaged by the forked arm to operate the shaft on reciprocation of the piston, the pin having a valve operating extension, a valve, a spring pressed plunger engaging the valve and against the action of which the valve is reciprocated, levers for reciprocating the valve, resilient means connecting the levers, the pin extension adapted to alternately engage the levers to move the levers, and a trip device engaging the levers and adapted to move the levers to move the valve and overcome the action of the spring plunger upon further movement of the pin extension, disengagement of said spring plunger causing the resilient means connecting the levers to move said valve with a snap action, and a system of oil circulation leading from the engine to and from the piston heads and in which said valve is interpolated to change the pressure from one piston head to the other and evacuate the opposite cylinder, whereby to reciprocate the piston, and means for stopping the action of the valve.

2. The invention, as defined in claim 1, wherein the stop means includes a cam pin to prevent further movement of the levers to overcome the action of the plunger to hold the valve in one position.

3. The invention, as defined in claim 1, wherein a spring comprises the resilient means connecting the levers, and the trip device is connected with the levers by means of hooked end formations.

4. The invention, as defined in claim 1, wherein the valve is elongated and has end extensions and spaced annular grooves to be engaged by the plunger over which the valve reciprocates.

5. The invention, as defined in claim 1, wherein the heads of the cylinder are removable, and attaching brackets are carried by the heads.

6. The invention as defined in claim 1, wherein a casing is formed on the cylinder and provided with a detachable cover, wherein the valve is mounted in the cover, and wherein the trip device and the levers and spring and plunger are carried by the cover.

7. The invention, as defined in claim 1, wherein the levers are pivoted in spaced relationship and extend substantially parallel in the same direction.

8. The invention, as defined in claim 1, wherein a casing is formed on the cylinder, a cover is removably secured to said casing and a valve housing for said valve is formed on said cover and the trip device is retained slidably in place on said housing by a pin.

WESLEY HALE BROWN.

REFERENCES CITED

The following references are of record in the file of this patent:

UNITED STATES PATENTS

| Number | Name | Date |
|---|---|---|
| 1,847,091 | Kuskin et al. | Mar. 1, 1932 |
| 2,060,684 | Moorhouse | Nov. 10, 1936 |
| 2,103,001 | Evans et al. | Dec. 21, 1937 |
| 2,265,307 | Orshansky, Jr. | Dec. 9, 1941 |
| 2,302,232 | MacNeil | Nov. 17, 1942 |
| 2,343,656 | Folberth et al. | Mar. 7, 1944 |
| 2,376,009 | Sacchini et al. | May 15, 1945 |